United States Patent
Venkumahanti et al.

(10) Patent No.: US 7,827,356 B2
(45) Date of Patent: Nov. 2, 2010

(54) SYSTEM AND METHOD OF USING AN N-WAY CACHE

(75) Inventors: Suresh Venkumahanti, Austin, TX (US); Phillip Matthew Jones, Round Rock, TX (US)

(73) Assignee: QUALCOMM Incorporated, San Diego, CA (US)

( * ) Notice: Subject to any disclaimer, the term of this patent is extended or adjusted under 35 U.S.C. 154(b) by 536 days.

(21) Appl. No.: 11/852,348

(22) Filed: Sep. 10, 2007

(65) Prior Publication Data

US 2009/0070531 A1 Mar. 12, 2009

(51) Int. Cl.
*G06F 12/00* (2006.01)

(52) U.S. Cl. .............. 711/128; 711/125; 711/156; 711/159; 711/202; 711/221

(58) Field of Classification Search .............. 711/128, 711/125, 156, 159, 202, 221
See application file for complete search history.

(56) References Cited

U.S. PATENT DOCUMENTS

| | | | |
|---|---|---|---|
| 6,594,728 B1 * | 7/2003 | Yeager | 711/127 |
| 7,290,089 B2 | 10/2007 | Parthasarathy et al. | |
| 7,330,936 B2 | 2/2008 | Tran et al. | |
| 2007/0113057 A1 | 5/2007 | Knoth | |
| 2009/0055589 A1 * | 2/2009 | Croxford et al. | 711/119 |

FOREIGN PATENT DOCUMENTS

| | | |
|---|---|---|
| WO | 03001384 | 1/2003 |
| WO | 2007096572 | 8/2007 |

OTHER PUBLICATIONS

European Search Report-EP08005115, Search Authority-The Hague-Dec. 17, 2008.
International Search Report-PCT/US08/075822, International Search Authority-European Patent Office-Dec. 29, 2008.
Nicolaescu D et al: "Reducing Power Consumption for High-Associativity Data Caches in Embedded Processors" Design, Automation and Test in Europe Conference and Exhibition, 2003 Munich, Germany Mar. 3-7, 2003, Los Alamitos, CA, USA, IEEE Comput, Soc, US, (Mar. 3, 2003), pp. 1064-1068.
Written Opinion-PCT/US08/075822, International Search Authority-European Patent Office-Dec. 29, 2008.

* cited by examiner

*Primary Examiner*—Stephen C Elmore
(74) *Attorney, Agent, or Firm*—Peter M. Kamarchik; Nicholas J. Pauley; Sam Talpalatsky

(57) ABSTRACT

A system and method of using an n-way cache are disclosed. In an embodiment, a method includes determining a first way of a first instruction stored in a cache and storing the first way in a list of ways. The method also includes determining a second way of a second instruction stored in the cache and storing the second way in the list of ways. In an embodiment, the first way may be used to access a first cache line containing the first instruction and the second way may be used to access a second cache line containing the second instruction.

30 Claims, 6 Drawing Sheets

300

| List of Instructions 302 |||
|---|---|---|
| Address | Way | Instruction |
| A1 | 3 | Instr 1 |
| A2 | 0 | Instr 2 |
| A3 | 3 | Instr 3 |
| A4 | 2 | Instr 4 |
| A5 | 0 | Instr 5 |
| A6 | 1 | Instr 6 |
| A7 | 3 | Instr 7 |
| A8 | 2 | Instr 8 |
| A9 | 1 | Loop End- JMP A4 |

| Way Table 304 |
|---|
| Loop End Address: A4 |
| 2 |
| 0 |
| 1 |
| 3 |
| 2 |
| 1 |
|  |

SYSTEM AND METHOD OF USING AN N-WAY CACHE

I. FIELD

The present disclosure is generally related to a system and method of using an n-way cache.

II. DESCRIPTION OF RELATED ART

Advances in technology have resulted in smaller and more powerful personal computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and IP telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can include a web interface that can be used to access the Internet. As such, these wireless telephones include significant computing capabilities.

Typically, as these devices become smaller and more powerful, they become increasingly resource constrained. For example, the screen size, the amount of available memory and file system space, and the amount of input and output capabilities may be limited by the small size of the device. Further, the battery size, the amount of power provided by the battery, and the life of the battery is also limited. One way to increase the battery life of the device is to reduce power consumed by data operations performed by a processor within the device.

Processors typically include a memory cache that provides a small storage capacity but with a fast access time. The memory cache is typically indexed using a portion of a requested memory address. An example of a memory cache is an n-way cache that may store multiple cache lines associated with each index value. With an n-way cache, multiple comparisons are typically performed to determine whether requested data is stored at a particular way of the n-way cache for a particular index value. Multiple comparisons consume power and limited processing resources.

Accordingly, it would be advantageous to provide an improved system and method of using an n-way cache.

III. SUMMARY

In a particular embodiment, a method is disclosed that includes determining a first way of a first instruction stored in a multi-way cache. The method includes storing the first way in a list of ways. The method also includes determining a second way of a second instruction stored in the multi-way cache. The method further includes storing the second way in the list of ways.

In another embodiment, a method is disclosed that includes storing way values at a way table. The way values may be associated with sequential data read operations from an n-way cache. The sequential data read operations may correspond to a first iteration of a processing loop. The method also includes sequentially retrieving the way values for the sequential data read operations from the way table during a next iteration of the processing loop.

In another embodiment, a device is disclosed that includes a table of entries containing a plurality of ways. Each entry in the table of entries identifies a way of an n-way cache. The device also includes a program counter to provide an address having an index. The index and the way identify a location of an instruction in the n-way cache.

In another embodiment, a wireless device is disclosed that includes an antenna and a transceiver coupled to the antenna. The wireless device also includes a processor coupled to the transceiver. The processor has a processor readable memory including a table of entries including a plurality of ways. Each entry in the table of entries identifies a way of an n-way cache. The processor also includes a program counter to provide a processor instruction address having an index. The index and the way identify a location of a process executable instruction in the n-way cache.

One particular advantage provided by embodiments of the system and method of using an n-way cache is provided in that reduced power operation, faster cache access, or both, may be obtained.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
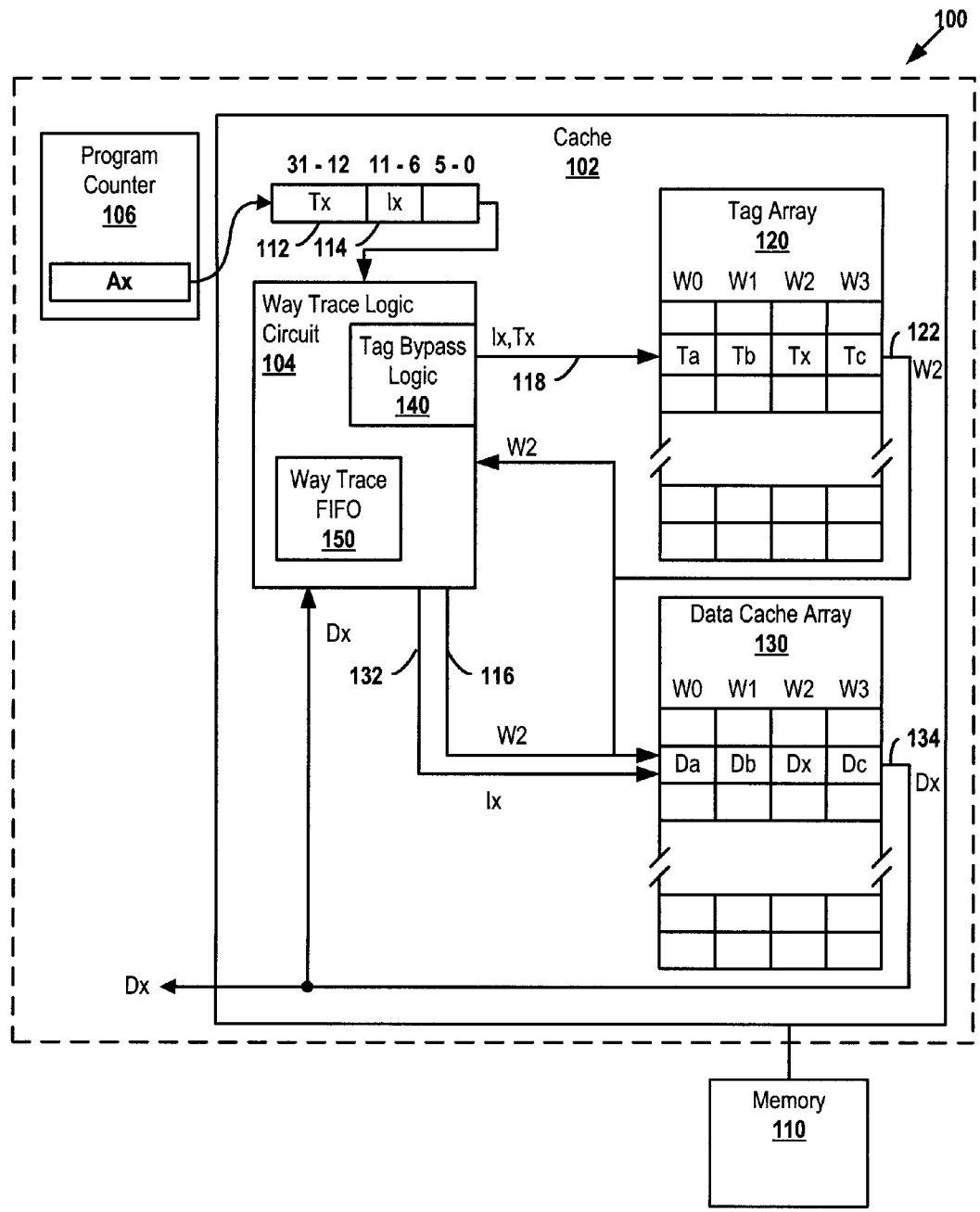
FIG. 1 is a block diagram of an embodiment of a system to use an n-way cache.

Referring to FIG. 1, a device 100, such as of a portion of a processor, is illustrated. The device 100 includes a system on a chip portion and an external memory 110. The system on a chip includes a cache memory 102 and a program counter 106. The cache memory 102 is a multi-way cache that includes a way trace logic circuit 104, a tag array 120, and a data cache array 130. In a particular embodiment, the data cache array 130 may be an instruction cache array.

The way trace logic circuit 104 is responsive to addresses received from the program counter 106. Each address from the program counter 106 includes a tag portion 112 and an index portion 1 14. In a particular illustrative embodiment, as shown in FIG. 1, the program counter address has 32 bits.

The way trace logic circuit 104 includes a tag bypass logic circuit 140 and a way trace buffer memory, such as a first-in first-out (FIFO) memory array 150. The tag bypass logic circuit 140 provides a control signal 118 to the tag array 120. In a particular embodiment, the control signal 118 includes an index value Ix and a tag value Tx. The index value and the tag value of the control signal 118 are provided as an input to the tag array 120 to retrieve a plurality of tag values based on the input index value. Each of the tag values retrieved from the tag array 120 corresponds to a different one of a plurality of ways. In a particular embodiment, an n-way cache includes n memory locations associated with each index value of the cache. A data value stored in the n-way cache may therefore be located using the index and a number identifying the way associated with the data value. In a particular embodiment, the tag array 120 is part of an n-way cache 102.

The input tag value (Tx) is compared to each of the plurality of tags from the tag array 120, based on the index value, at the way trace logic circuit 104 to determine a matching tag and the associated identified way. In the particular illustrative example in FIG. 1, the tag value Tx corresponds to way W2. In this example, the identified way W2 is provided at an output 122 of the tag array 120 and such way output 122 is provided to the way trace logic circuit 104 and also to the data cache array 130. In the event that the tag array 120 does not contain a tag matching the tag value Tx at any way associated with the input index value (Ix), then a cache miss has occurred and a request to retrieve the instruction is made to the external memory 110.

The way trace logic circuit 104, after receiving the identified way value, provides the index value at an output 132, which is fed to an input of the data cache array 130. In addition, the way trace logic circuit 104 may also provide a pre-determined way value 116 which may be read from the way trace buffer memory 150.

The data cache array 130 includes a plurality of computer executable instructions that are identified according to a plurality of different ways. For example, as shown in FIG. 1, four different ways are shown and each way corresponds to a different set of computer executable instructions. As such, when the data cache array 130 receives the index value and the way value, an identified computer executable instruction Dx is retrieved from the data cache array 130 and is provided at an output 134. In the event that, based on the index value and the way value, the identified computer executable instruction is not found in the data cache array 130, then a cache miss has occurred and a request to retrieve the instruction is made to the external memory 110.

Once a computer executable instruction 134 (Dx) is output from the data cache array 130, the way value for the computer executable instruction is traced and is stored in a table of entries within the way trace logic circuit 104. In a particular embodiment, the table of entries may be stored in the way trace FIFO buffer 150 and may be configured as the way table 304 depicted in FIG. 3. In another embodiment, the way trace data may be stored as a table or a simple array in computer readable memory, or in a dedicated register. As instructions 134 are output from the cache memory 102, such instructions are also provided at an input to the way trace logic circuit 104 to be correlated and aligned with the associated way information 122 provided by the tag array 120 so as to store such information in the way trace FIFO buffer 150. The stored way trace information may then be used in subsequent processing to conserve power and processing resources by directing specific way information from the way trace logic circuit 104 to the data cache array 130, thereby avoiding extra computation associated with retrieving multiple values from the tag array 120 and performing multiple matching operations to determine an associated way. In a particular embodiment, the specific way information includes way numbers.

In the particular illustrative embodiment, the program counter 106 provides an address having an index 114. The index 114 and the way of the n-way cache together identify a location of a particular instruction in the data cache array 130. In a particular embodiment, the tag array 120 also has an input 118 responsive to the index value 114.

In addition, the way trace logic circuit 104 has access to the table of entries including the stored way values, such as use of the way trace FIFO buffer 150. The way trace logic circuit 104 includes logic to compare a tag value 112 retrieved from the tag array 120 to a corresponding tag value retrieved from the program counter 106 to determine a way associated with the instruction Dx. With this matching logic, the way trace logic circuit 104 can verify and authenticate a tag retrieved from the tag array 120. The way trace logic circuit 104 provides the index 132 and the way 116 to the data cache array 130 after determining that the tag value from the tag array 120 matches the tag value from the program counter 106.

In a particular illustrative embodiment, each of the plurality of ways stored in the table of way entries (e.g. the way trace FIFO buffer 150) is stored in an order that is associated with a corresponding plurality of computer executable instructions stored within the n-way data cache array 130. In a particular embodiment, the first entry in the table of entries corresponds to a beginning of a loop of instructions. An example of the loop of instructions is a processing loop that may be performed by a digital signal processor. Such processing loops are used in many different applications by digital signal processor devices. In another example, one of the computer executable instructions is associated with entering the loop. In this manner, the way trace FIFO buffer 150 can store each of the instructions in a particular loop and can use stored information from a first pass through the loop to then conserve power and processing resources by retrieving way values for instructions in subsequent passes through the processing loop. Thus, such processing can be performed at lower power and reduced cost.

In a particular embodiment, the table of entries in the way trace FIFO buffer 150 is implemented as a memory that is independent from data stored in the n-way data cache array 130. The table of entries stored in the way trace FIFO buffer 150 includes way values, such as way value W2, but the way trace FIFO buffer 150 does not include the computer executable instructions that are found within the data cache array 130.

For example, when an end of loop packet is detected that indicates a jump to the start of a closed processing loop, the way trace logic circuit 104 may begin populating the table of entries stored in the way trace FIFO buffer 150. The first entry written to the way trace FIFO buffer 150 may be the address of the loop start that is indicated by the detected end of loop packet. As each instruction of the loop is sequentially retrieved from the data cache array 130, the way trace logic circuit 104 may store the way value associated with the instruction at the way trace FIFO buffer 150.

During the loop, as the way values are stored at the way trace FIFO buffer 150, the way trace logic circuit 104 may compare requested instruction addresses to the loop start address that is stored at the way trace FIFO buffer 150. When the loop start address is detected, indicating that the current iteration of the loop is complete and a next loop iteration is beginning, the way trace FIFO buffer 150 will be populated with way values associated with the loop instructions in the order requested by the processor. The way trace logic circuit 104 may begin reading way values from the way trace FIFO buffer 150 and thus perform fewer read operations from the tag array 120 during subsequent iterations of the loop.

Although each way of the data cache array 130 is depicted as storing a single instruction, it should be clearly understood that each way of the data cache array 130 may store multiple data words or instructions in a unit of data referred to as a cache line. Each data read operation at the data cache array 130 may return a cache line that includes multiple instructions, from which the requested instruction may be retrieved.

Figure 2:
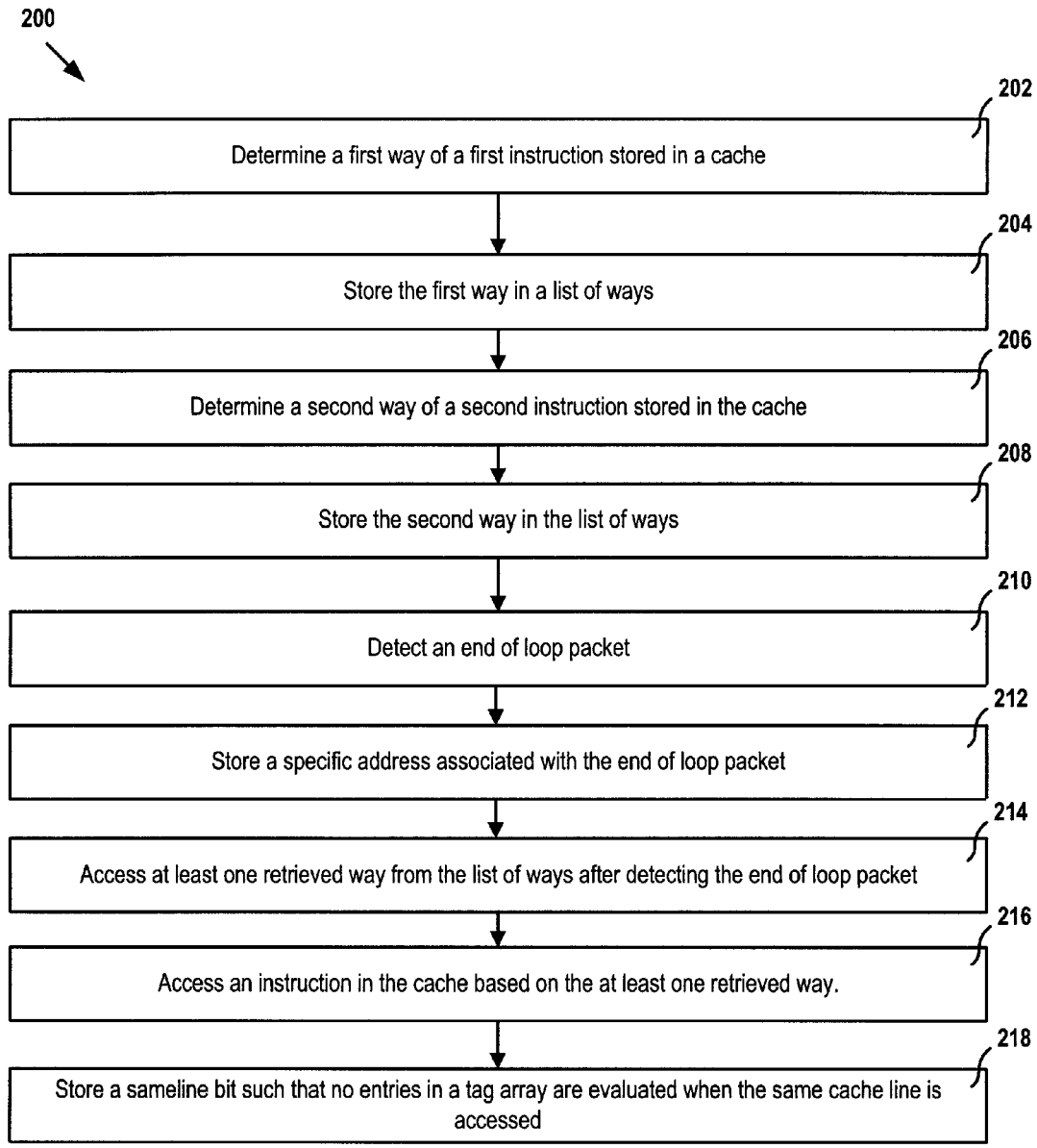
FIG. 2 is a flow chart of an embodiment of a method of using an n-way cache.

Referring to FIG. 2, a method of operation with respect to a multi-way cache is illustrated. The method includes determining a first way of a first instruction stored in a cache, as shown at 202. The method further includes storing the first way in a list of ways, such as storage in the way trace FIFO buffer 150 of FIG. 1, as shown at 204. The method further includes determining a second way of a second instruction stored in the cache, at 206, and storing the second way in the list of ways, at 208.

In a particular embodiment, the method further includes detecting an end of loop packet, as shown at 210. An end of loop packet may be determined by detecting a particular instruction, such as a jump instruction, which signals an end of a pass or iteration of a processing loop of instructions. The method may further include storing a specific address associated with the end of loop packet, at 212. After detecting the end of loop packet, the method may include accessing at least one retrieved way from the list of ways, as shown at 214. For example, when a processor is referencing the beginning of the loop, a logic circuit, such as the way trace logic circuit 104 of FIG. 1, may retrieve the stored way information associated with the beginning of the loop from the list of ways.

An instruction in the cache may be accessed based on at least one retrieved way, at 216. For example, the retrieved way value may be used to perform a single read of a tag array, such as the tag array 120, to verify that the instruction is stored at an instruction array, and will not result in a cache miss. The retrieved way value may then be used to retrieve a cache line of the instruction array that contains the instruction.

In a particular embodiment, the method may optionally include storing a sameline bit or other identifier in addition to, or in place of, way information for an instruction, such that no entries in a tag array are evaluated when the same cache line is accessed, at 218. The sameline bit may identify that a particular instruction is located at a same cache line of the instruction array as an immediately prior instruction. Therefore, when the prior instruction is retrieved successfully, the sameline bit enables retrieval of the subsequent instruction from the cache without first checking for a cache miss via the tag array. In an illustrative embodiment, the sameline bit may be stored in an independent bit array, such as the sameline bit array 406 depicted in FIG. 4.

In a particular embodiment, the first way corresponds to a way value retrieved from a tag array. In addition, the second way may also be retrieved as a way value from the tag array. While the cache is described as a multi-way cache, the cache may also be described as an n-way cache where n may be a value greater than one. In a particular embodiment, n is 4. In addition, it should be understood that a specific address associated with the end of loop packet may be accessed and stored within the list of ways. The specific address associated with the end of loop packet may be used to identify an instruction that identifies the end of loop for subsequent processing. By use of the method described, the instruction in the cache may be accessed in response to a way from a pre-stored list of ways instead of evaluating multiple tags of the tag array.

In a particular embodiment, the disclosed system provides a low-cost method to reduce power consumption due to tag array access and tag matching for executing digital signal processor loops. The disclosed system and method provide reduced power operation by storing a trace of the ways accessed, but without storing the particular computer executable instructions from the n-way cache. The hardware structure associated with the list of ways is low cost in area and in power requirements. Also, the structure provides the ability to access a cache line to store traces of large programming loops. In addition, while reference has made to a FIFO, any other similar hardware structure may be used for storage of the way trace data. By storing the way trace data for subsequent processing though the DSP loop, the method can read only one way of the tag array, thereby reducing power consumption. Also, in a cache where the system reads part of the cache line every access, the system can store the sameline bit for the cache line such that no access to the tag array would be required.

Figure 3:
FIG. 3 is a view of data structures that may be used with an n-way cache.

Referring to FIG. 3, a particular illustrative embodiment of data structures that may be used with an n-way cache is depicted and generally designated 300. The system 300 includes an illustrative list of instructions 302 and a way table 304. In a particular embodiment, the way table 304 may be stored at a FIFO buffer, such as the way trace FIFO buffer 150 depicted in FIG. 1.

In a particular embodiment, the illustrative list of instructions 302 reflects data corresponding to instructions requested of a cache, such as the cache 102 of FIG. 1, by a processor, such as a DSP. The illustrative list of instructions 302 includes a first column of instruction addresses, a second column of way values, and a third column of instruction words. The instruction address and the way associated with the instruction are used to access a corresponding cache line that contains the requested instruction from the cache. For example, the first data row of the illustrative list of instructions 302 includes a first address A1, which is located at way 3, and the corresponding instruction, INSTR1, is a computer instruction word at the cache line associated with address A1 and way 3. It should be understood that the illustrative list of instructions 302 depicts data associated with sequential cache requests to illustrate operations at the way table 304. The illustrative list of instructions 302 need not correspond to an actual table or data structure used with an n-way cache.

The illustrative list of instructions 302, in the illustrative embodiment of FIG. 3, includes nine instruction words, beginning with the instruction word INSTR1 that is located at address A1 and way 3 of a data cache array, and continuing to an instruction located at address A9, way 1.

The instruction located at address A9, way 1, of the particular embodiment illustrated in FIG. 3, is a special packet designating a loop end. In addition, the instruction at address A9, way 1 includes a jump command to an address A4. In a particular embodiment, the loop end special packet at address A9 indicates that each iteration of the processor loop begins at the instruction at address A4 and ends with the instruction at address A9.

The way table 304 includes data associated with each way value corresponding to sequentially accessed cache lines in a processor-executed loop. The first entry in the way table 304 is the address A4, retrieved from the loop end special packet. The following sequential data elements of the way table 304 indicate a way value associated with each sequential cache line requested of the cache memory, by the processor in the processing loop.

For example, the way value associated with the instruction at address A4, as illustrated in the list of instructions 302, is 2. Similarly, the first way data element of the way table 304 is the numeral 2. Continuing through the sequential cache line retrievals illustrated in the illustrative list of instructions 302, the next instruction triggering a cache access, at address A5, has an associated way of 0. Likewise, the second way data element of way table 304 is also 0. Way table 304 includes way values for sequential cache line requests of the processor, until the end of the processing loop, ending at the instruction at address A9, way 1.

In a particular embodiment, when a loop is detected in the processing of instructions, such as via a loop end special packet, the way table 304 may be first populated with the address of the first instruction of the next iteration of the processing loop. In the illustrative embodiment of FIG. 3, the address of the first instruction is A4. The way table 304 can continue to be filled with data values corresponding to way data for each sequential cache line retrieved from a cache, such as the data cache array 130, and may be determined via a tag array, such as the tag array 120 of FIG. 1.

Once the way table 304 has been populated with data values corresponding to a processing loop, additional iterations of the processing loop may be performed without requiring additional accesses to the tag array to determine way values for each retrieved cache line. Therefore, processing speed, power consumption, and other benefits may be obtained.

Although an illustrative list of instructions 302 and a way table 304 are depicted in FIG. 3, it should be understood that neither the illustrative list of instructions 302 nor the way table 304 need be implemented as individual tables, or arrays. For example, way table 304 may be implemented in a first-in first-out (FIFO) buffer. As another example, data associated with the illustrative list of instructions 302 may be stored in any other data structure or multiple structures, or may not be stored at all, as long as the processor is capable of requesting and receiving the requested instructions.

Figure 4:
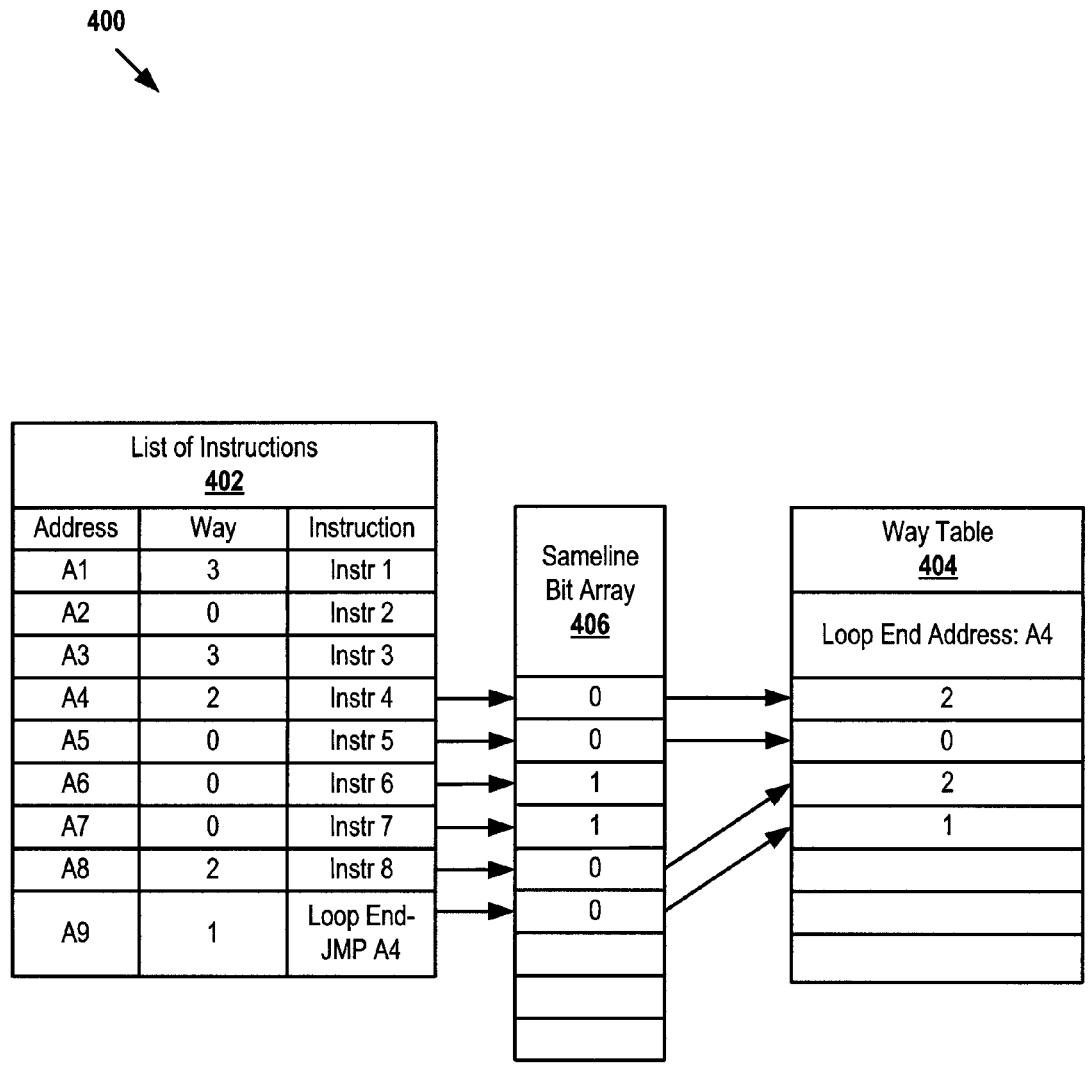
FIG. 4 is another view of data structures that may be used with an n-way cache.

Referring to FIG. 4, another illustrative embodiment of data structures that may be used with an n-way cache is depicted and generally designated 400. The system 400 includes an illustrative list of instructions 402, a way table 404, and a sameline bit array 406. Generally, the illustrative list of instructions 402 corresponds to the illustrative list of instructions 302 depicted in FIG. 3, and the way table 404 corresponds to the way table 304 depicted in FIG. 3.

In a particular embodiment, the sameline bit array 406 may store data that indicates whether each instruction of a processing loop is located in the same cache line as the previous instruction of the loop. In the example of FIG. 4, a processing loop includes the instructions at addresses A4, A5, A6, A7, A8, and the Loop End instruction at A9. The instructions at addresses A5, A6, and A7 are stored at a same cache line of an instruction cache, meaning that the same index and way value are used to retrieve each instruction from the instruction cache.

In a particular embodiment, when a loop is detected in the processing of instructions, the sameline bit array 406 may be sequentially populated with data values that indicate for each instruction whether the instruction is stored at the same cache line as the prior instruction. Each instruction of the loop may have a corresponding bit in the sameline bit array 406 that is set to a logical high value "1" or a logical low value "0." When the instruction is stored at a different cache line than the prior instruction, a "0" may be stored at the sameline bit array 406, and a way value may be stored in the way table 404. However, when the instruction is stored at the same cache line as the prior instruction, a "1" may be stored at the sameline bit array 406, and no entry may be made in the way table 404 for the instruction. Thus, the sameline bit array 406 will contain a data value for each instruction of the processing loop, but the way table 404 may contain fewer way values than the number of instructions in the loop.

For example, the first loop instruction at address A4 has a corresponding entry of "0" in the sameline bit array 406, indicating that the instruction is not located in a prior cache line. The way value "2" for the instruction at A4, retrieved via a tag array, is stored at the first way storage location of the way table 404. The next instruction at A5 has an entry of "0" in the sameline bit array 406, indicating that the instruction is located at a different cache line than the instruction at A4, and the corresponding way value "0" is stored at the second way entry of the way table 404. The following instructions at A6 and A7 are located at the same cache line as the instruction at A5, as indicated by "1" entries in the sameline bit array 406, and do not have a corresponding entry in the way table 404.

The last two instructions at A8 and A9 are each located at separate cache lines, indicated by "0" entries in the sameline bit array 406 and with corresponding "2" and "1" entries in the way table 404. Thus, although the loop includes six instructions, only four way values are stored at the way table 404.

Once the way table 404 has been populated with data values corresponding to a processing loop, additional iterations of the processing loop may be performed without requiring additional accesses of the tag array to determine way values for each retrieved cache line. Before an instruction is retrieved, an index and the way value may be sent to the tag array to ensure the instruction has not been overwritten in the cache. However, when the sameline bit array 406 indicates that the instruction is at a same cache line as the prior instruction, no such check need be performed at the tag array. Hence, when multiple sequential instructions are located in a same cache line, a system using the sameline bit array 406 and the way table 404 may use less memory and perform fewer tag array read operations than a system that does not record sameline information.

In another embodiment, the sameline data of the sameline bit array 406 and the way data of the way table 404 may be combined in a single data structure. For example, a table such as the way table 404 may store a "sameline" indicator in addition to or in place of a way value for each instruction that is in the same cache line as the preceding instruction.

Figure 5:
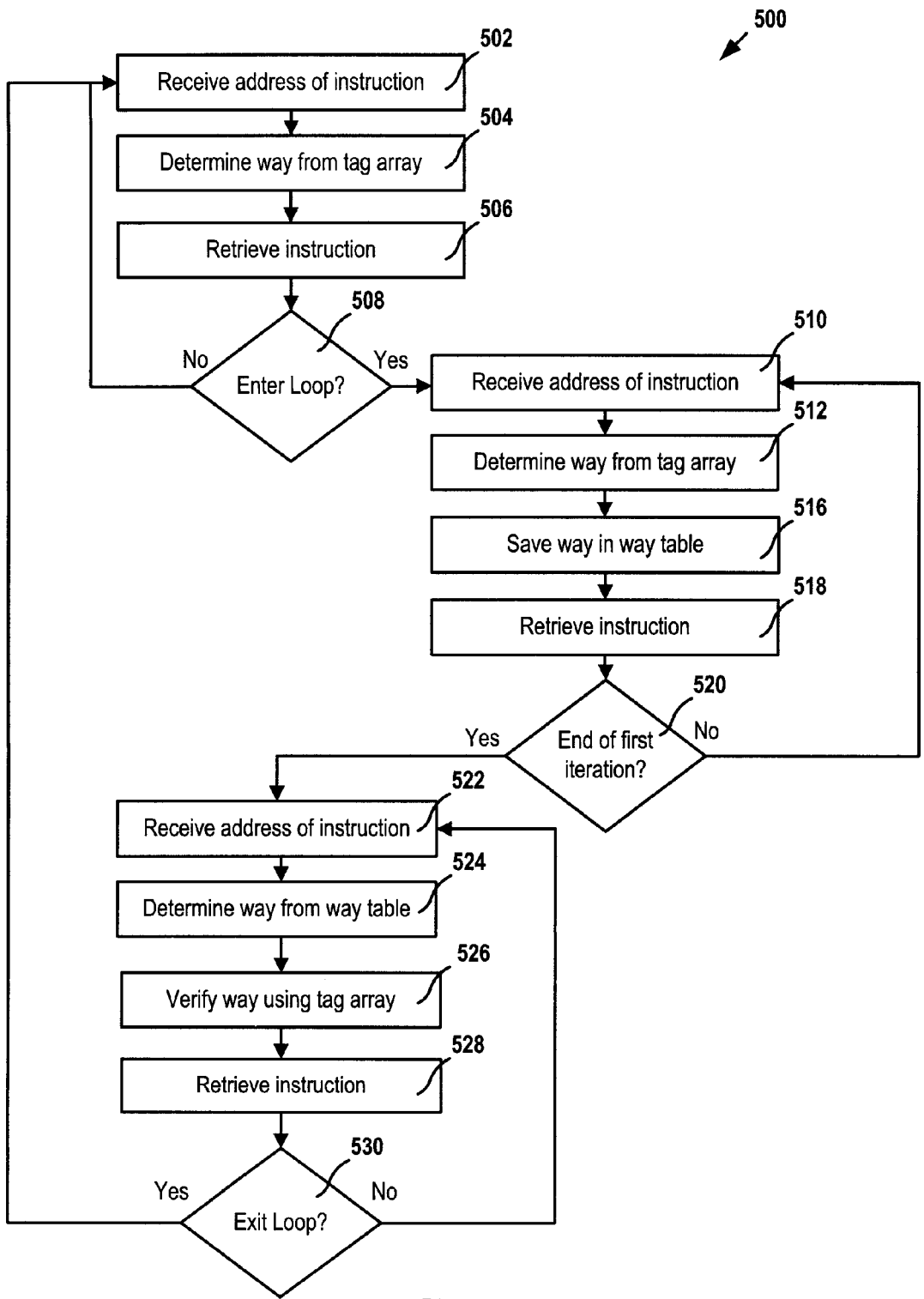
FIG. 5 is a flow chart of another embodiment of a method of using an n-way cache.

Referring to FIG. 5, a particular illustrative embodiment of a method of using way trace information is depicted and generally designated 500. An address of an instruction is received, at 502. In a particular embodiment, the address of the instruction may be received at an input to an n-way cache. In a particular embodiment, a way associated with the address is determined, at 504. For example, the way may be determined from a tag array, such as the tag array 120 of FIG. 1. The instruction may be retrieved, at 506. The instruction may be retrieved from a data cache array, such as the data cache array 130 of FIG. 1, using the instruction address and the way associated with the instruction address, at 506.

The method continues to decision step 508, where a determination is made whether the instruction indicates that a processing loop has been entered. In a particular embodiment, entry into a processing loop may be indicated by a special packet that includes an address of first instruction of the processing loop. If the instruction does not indicate an entry into a processing loop, the method returns to 502. If the instruction indicates an entry into a processing loop, the method continues at 510, where an address of the first instruction of the processing loop is received.

Advancing to 512, a way for the requested instruction is determined from the tag array, and the corresponding way is saved in a way table, at 516. In an illustrative embodiment, the way table may be the way table 304 of FIG. 3. In another illustrative embodiment, the way table may include a data storage element for way values, such as the way trace FIFO buffer 150 of FIG. 1.

Processing continues at 518, where the requested instruction is retrieved. A determination is made whether the instruction indicates the end of the first iteration of the processing loop, at 520. If the instruction does not indicate the end of the first iteration of the processing loop, the method returns to 510, where an address of a next instruction in the loop is received. Otherwise, when the retrieved instruction indicates the end of the first iteration of the processing loop, a second iteration of the processing loop begins at 522, where an instruction address is received.

In a particular embodiment, the instruction requested at 522 was previously retrieved during the first iteration of the processing loop and thus has a corresponding way stored at the way table. The way corresponding to the requested instruction is determined from the way table, at 524.

In a particular embodiment, the way may be verified using the tag array, at 526. For example, one or more other processes may perform a data fill at the cache that overwrites the instruction. By retrieving only the tag value from the tag array associated with index and the way of the requested instruction, the retrieved tag may be compared to the tag of the requested instruction to verify the instruction has not been overwritten. In a particular embodiment, a sameline bit may be used to indicate when a cache line for a particular instruction is the same as for an immediately prior instruction. If so, the verification step using the tag array need only be performed for the prior instruction.

The instruction is retrieved using the index from the address and the way from the way table, at 528. At 530, a determination is made whether the instruction causes the processor to execute a logical processing branch that exits the loop. If a determination is made that the instruction does not cause an exit from the loop, the method returns to 522. Otherwise, when the instruction causes a loop exit at 530, the method returns to 502.

Figure 6:
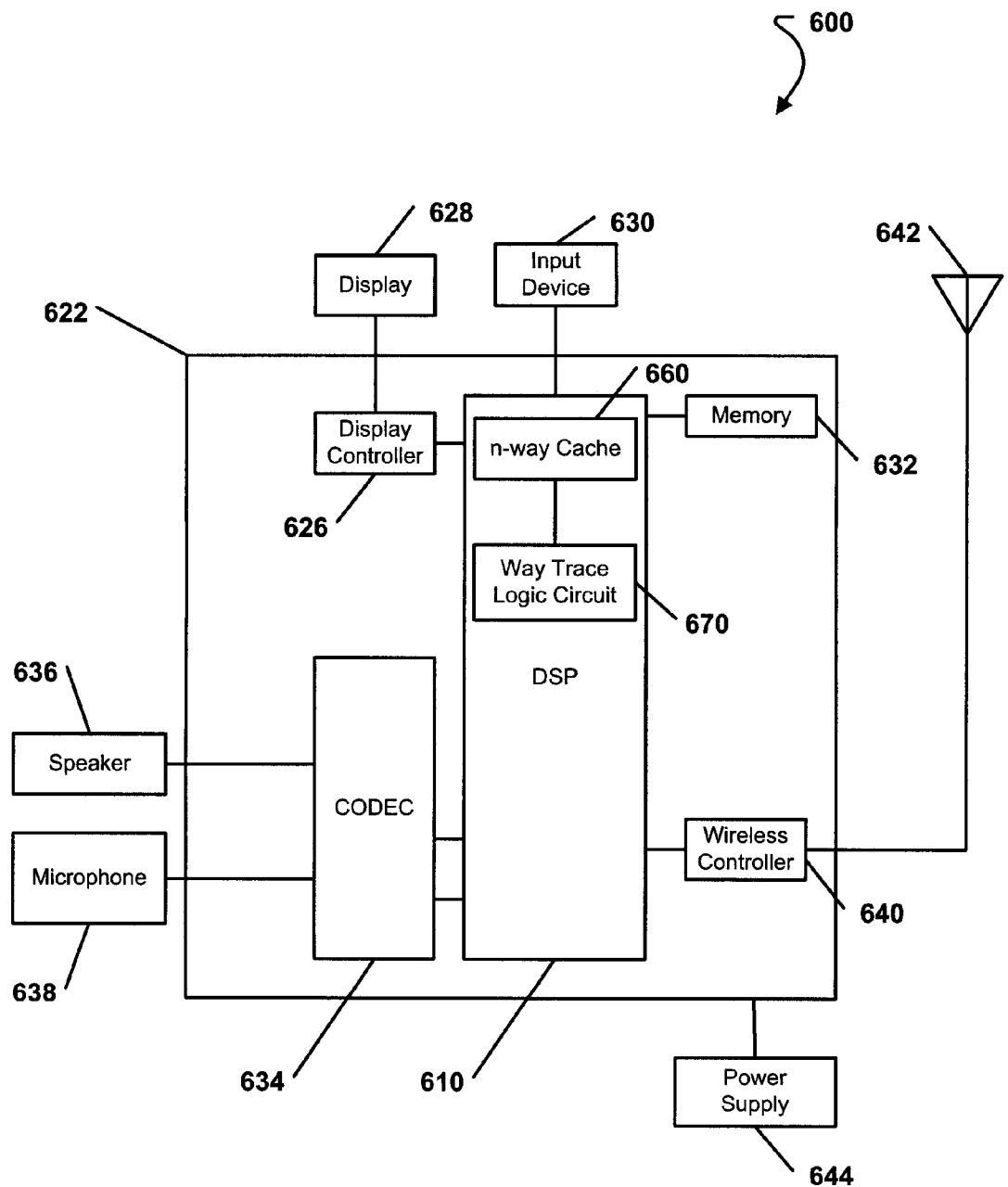
FIG. 6 is a block diagram of another embodiment of a system to use an n-way cache.

FIG. 6 is a block diagram of an embodiment of a system to use an n-way cache, illustrated as a portable communications device 600. The portable communications device 600 includes an n-way cache 660 coupled to a way trace logic circuit 670. In a particular embodiment, the way trace logic circuit 670 and the n-way cache 660 may include the cache 102 and the way trace logic circuit 104 of FIG. 1, and may implement at least a portion of one or more of the methods depicted in FIGS. 2 and 4, such as by storing and updating way trace data using a table such as the way table 304 of FIG. 3. The portable communications device 600 includes an on-chip system 622 that includes a processor, such as a digital signal processor 610. The digital signal processor 610 includes the n-way cache 660 coupled to the way trace logic circuit 670, as described with respect to FIGS. 1-5. In a particular illustrative embodiment, the way trace logic circuit 670 may be used to reduce power consumption, increase processing speed, or both, of processors, such as the digital signal processor 610, and system on chip devices, such as the on-chip system 622.

In a particular embodiment, power consumption may be reduced during processing by storing and retrieving way information for each instruction requested by the digital signal processor 610 during processing operation loop, thereby reducing a number of tag array accesses and comparisons associated with retrieving each instruction from the n-way cache 660. Reducing a number of tag array accesses and comparisons may reduce a power consumption associated with instruction retrieval. Similarly, reducing a number of tag array accesses and comparisons for each instruction may decrease an individual or overall instruction retrieval time from the n-way cache 660.

FIG. 6 also shows a display controller 626 that is coupled to the digital signal processor 610 and to a display 628. Moreover, an input device 630 is coupled to the digital signal processor 610. Additionally, a memory 632 is coupled to the digital signal processor 610. A coder/decoder (CODEC) 634 can also be coupled to the digital signal processor 610. A speaker 636 and a microphone 638 can be coupled to the CODEC 634.

FIG. 6 also indicates that a wireless controller 640 can be coupled to the digital signal processor 610 and to a wireless antenna 642. In a particular embodiment, a power supply 644 is coupled to the on-chip system 622. Moreover, in a particular embodiment, as illustrated in FIG. 6, the display 628, the input device 630, the speaker 636, the microphone 638, the wireless antenna 642, and the power supply 644 are external to the on-chip system 622. However, each is coupled to a component of the on-chip system 622.

In a particular illustrative embodiment, the way trace logic circuit 670 may be used to enhance overall performance of the portable communications device 600. In particular, the way trace logic circuit 670 may eliminate multiple cache reads and comparisons associated with each retrieved instruction during processing loops, thereby extending battery life, improving power efficiencies overall, reducing processing time and resource usage, and enhancing the performance of the device 600.

It should be understood that while the n-way cache 660 and the way trace logic circuit 670 are depicted as separate components of the digital signal processor 610, the n-way cache 660 and the way trace logic circuit 670 may instead be integrated into a single cache unit, such as the cache 102 of FIG. 1. Similarly, it should be understood that multiple way trace logic elements may be included, for example, for multiple processing paths of a single processing loop. As another example, multiple way trace logic elements may be included for multiple caches of the digital signal processor 610, such as for a dedicated instruction cache and a dedicated data cache. As yet another example, multiple way trace logic elements may be included to enhance performance for one or more threads of a multithreaded processing operation.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the disclosed embodiments. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope possible consistent with the principles and novel features as defined by the following claims.

What is claimed is:

1. A method comprising:
   determining a first way of a first instruction stored in a multi-way cache;
   storing the first way in a list of ways;
   determining a second way of a second instruction stored in the multi-way cache;
   storing the second way in the list of ways; and
   detecting an end of loop packet.

2. The method of claim 1, wherein the first way comprises a way value retrieved from a tag array.

3. The method of claim 1, further comprising determining the end of loop packet by detecting a particular instruction that signals an end of a pass or iteration of a processing loop of instructions.

4. The method of claim 1, further comprising accessing at least one retrieved way from the list of ways after detecting the end of loop packet.

5. The method of claim 4, further comprising accessing an instruction in the multi-way cache based on the at least one retrieved way.

6. The method of claim 5, wherein the multi-way cache is an n-way cache, and wherein n is greater than two.

7. The method of claim 6, wherein n is four.

8. The method of claim 7, wherein the first way and the second way are retrieved from a tag array.

9. The method of claim 5, wherein the instruction in the multi-way cache is accessed in response to the at least one retrieved way without evaluating multiple tags of the tag array.

10. The method of claim 9, wherein a part of a cache line is read, and further comprising storing a sameline bit such that no entries in the tag array are evaluated when the same cache line is accessed.

11. The method of claim 1, further comprising storing a specific address associated with the end of loop packet.

12. A device comprising:
    a table of entries containing a plurality of ways, each entry in the table of entries identifying a way of an n-way cache; and
    a program counter to provide an address having an index, wherein the index and the way identify a location of an instruction in the n-way cache, and
    wherein the plurality of ways are stored in an order associated with a corresponding plurality of computer executable instructions stored within the n-way cache.

13. The device of claim 12, wherein the n-way cache includes a tag array having an input responsive to the index.

14. The device of claim 12, further comprising a way trace logic circuit, the way trace logic circuit having access to the table of entries.

15. The device of claim 14, wherein the way trace logic circuit provides an output to the n-way cache.

16. The device of claim 15, wherein the way trace logic circuit provides a way item and an index to the tag array, and wherein the way trace logic circuit includes logic to compare a tag value retrieved from a tag array to a corresponding tag value from the program counter.

17. The device of claim 16, wherein the way trace logic circuit provides the way item to the n-way cache after determining that the tag value retrieved from the tag array matches the corresponding tag value from the program counter.

18. The device of claim 12, wherein one of the plurality of computer executable instructions is associated with entering a loop of instructions.

19. The device of claim 12, wherein a first entry in the table of entries corresponds to a beginning of a loop of instructions.

20. The device of claim 19, wherein one of the plurality of computer executable instructions is associated with an end of the loop of instructions.

21. The device of claim 12, wherein the table of entries is independent from data stored in the n-way cache, and wherein the table of entries stores way values but does not store computer executable instructions.

22. The device of claim 12, wherein the table of entries comprises a first in first out buffer to store a plurality of way traces.

23. A method comprising:
    storing way values in a way table, the way values associated with sequential data read operations from an n-way cache, the sequential data read operations corresponding to a first iteration of a processing loop;
    sequentially retrieving the way values for the sequential data read operations from the way table during a next iteration of the processing loop; and
    detecting an end of loop packet.

24. The method of claim 23, wherein a beginning of the first iteration of the processing loop is associated with a first retrieval of a loop end instruction from the n-way cache, and wherein an end of the first iteration of the processing loop is associated with a next retrieval of the loop end instruction from the n-way cache.

25. The method of claim 23, further comprising using at least one of the way values to access only a single cache line from an n-way tag array.

26. The method of claim 23, further comprising accessing data stored at the n-way cache using at least one of the way values from the way table.

27. A wireless device comprising:
    an antenna;
    a transceiver coupled to the antenna;
    a processor coupled to the transceiver, the processor comprising:
        a processor readable memory including a table of entries including a plurality of ways, each entry in the table of entries identifying a way of an n-way cache;
        a program counter to provide a processor instruction address having an index,
        wherein the index and the way identify the address of a processor executable instruction in the n-way cache, and
        wherein the plurality of ways are stored in an order associated with a corresponding plurality of processor executable instructions stored within the n-way cache.

28. The wireless device of claim 27, wherein the processor is a digital signal processor.

29. The wireless device of claim 27, further comprising:
    means for coding and decoding sound data; and
    means for providing visual information.

30. The wireless device of claim 29, wherein the means for coding and decoding sound data includes a codec coupled to the processor and further coupled to each of a microphone and a speaker, and wherein the means for providing visual information includes a display controller coupled to the processor and further coupled to a display.

* * * * *